No. 850,777. PATENTED APR. 16, 1907.
C. H. MOSHER.
LAWN CLEANER.
APPLICATION FILED MAR. 24, 1906.
5 SHEETS—SHEET 4.
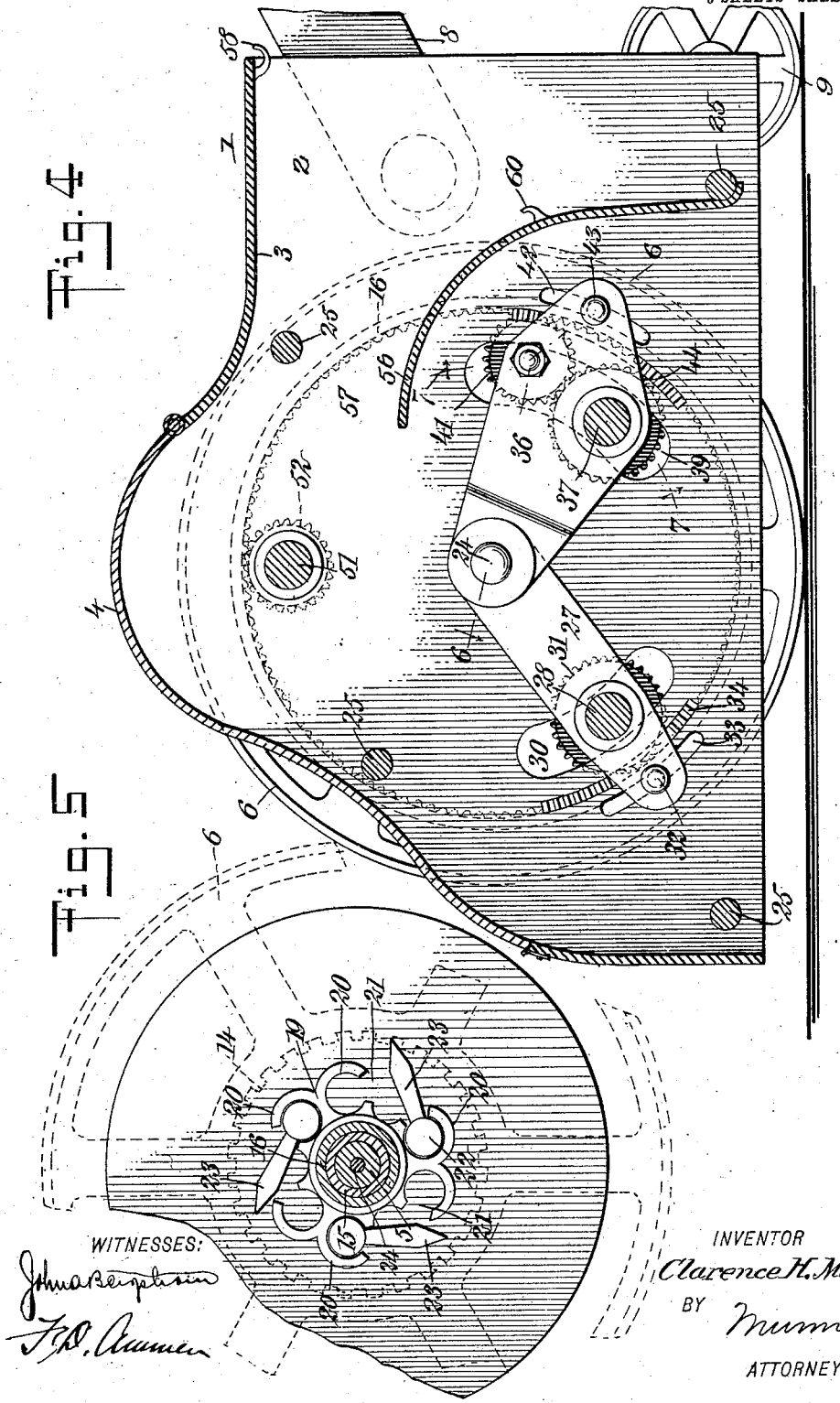
WITNESSES:
INVENTOR
Clarence H. Mosher
BY
Munn & Co
ATTORNEYS No. 850,777. PATENTED APR. 16, 1907.
C. H. MOSHER.
LAWN CLEANER.
APPLICATION FILED MAR. 24, 1906.
5 SHEETS—SHEET 5.
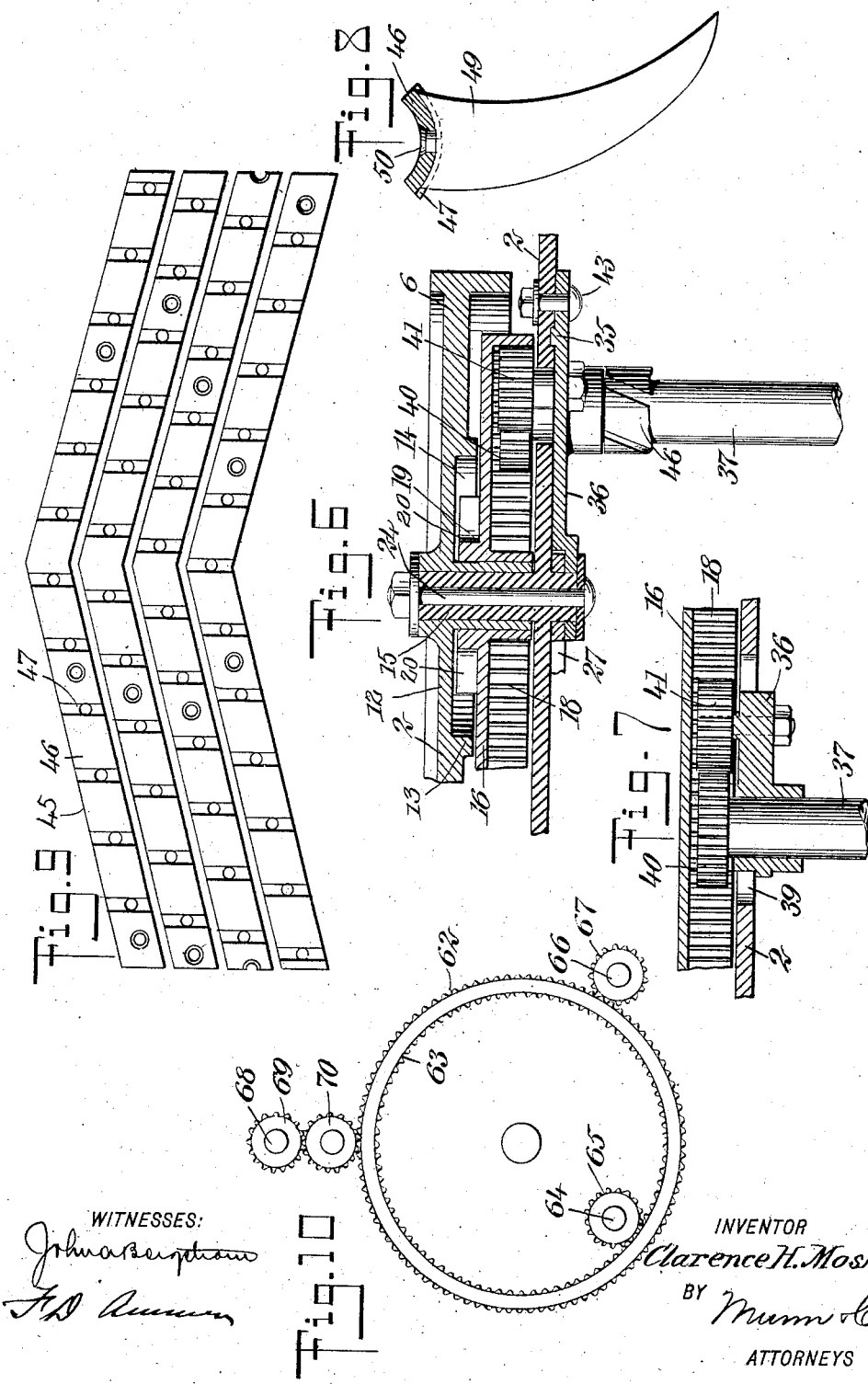
WITNESSES:
INVENTOR
Clarence H. Mosher
BY
Munn & Co
ATTORNEYS

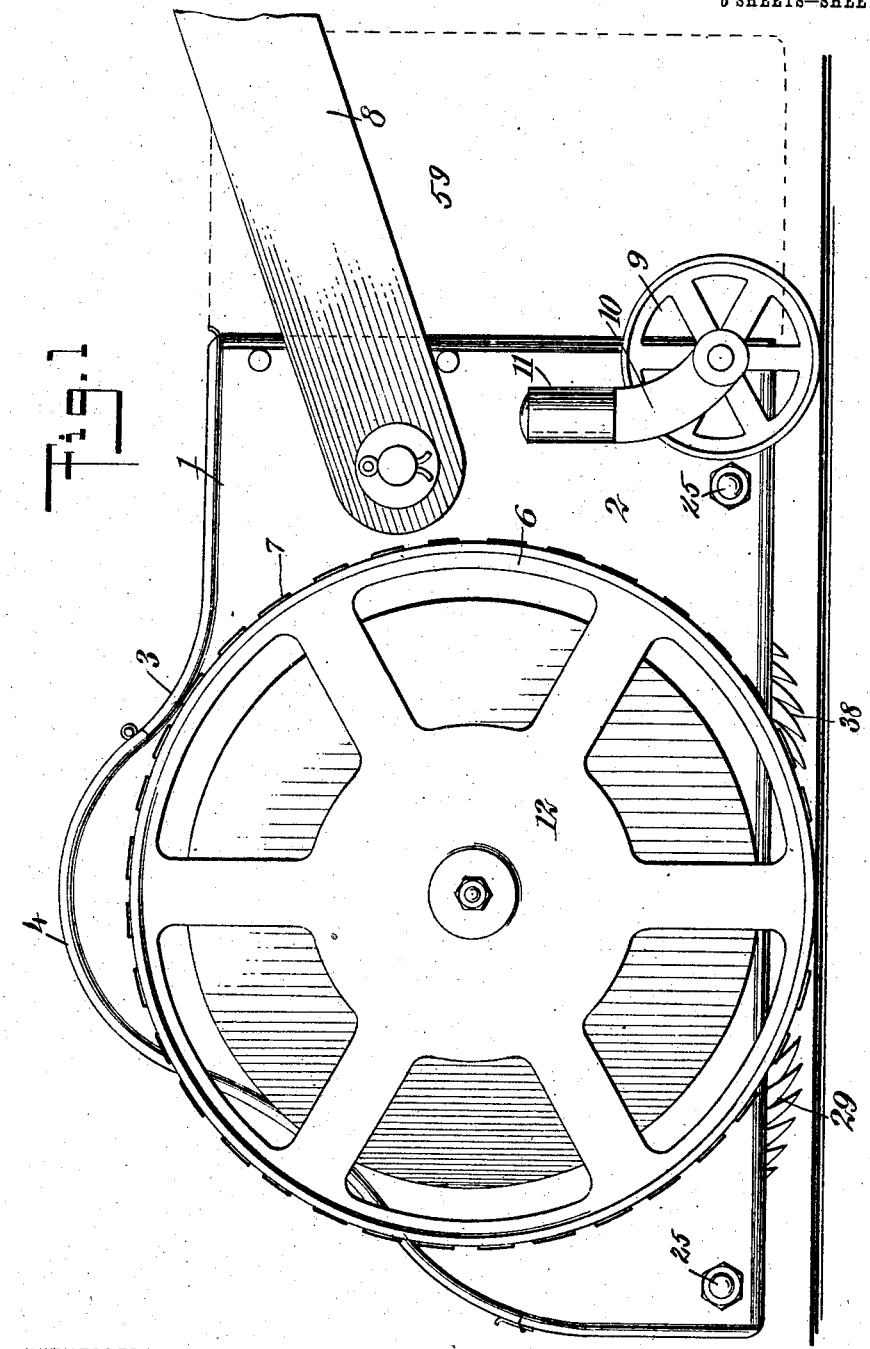

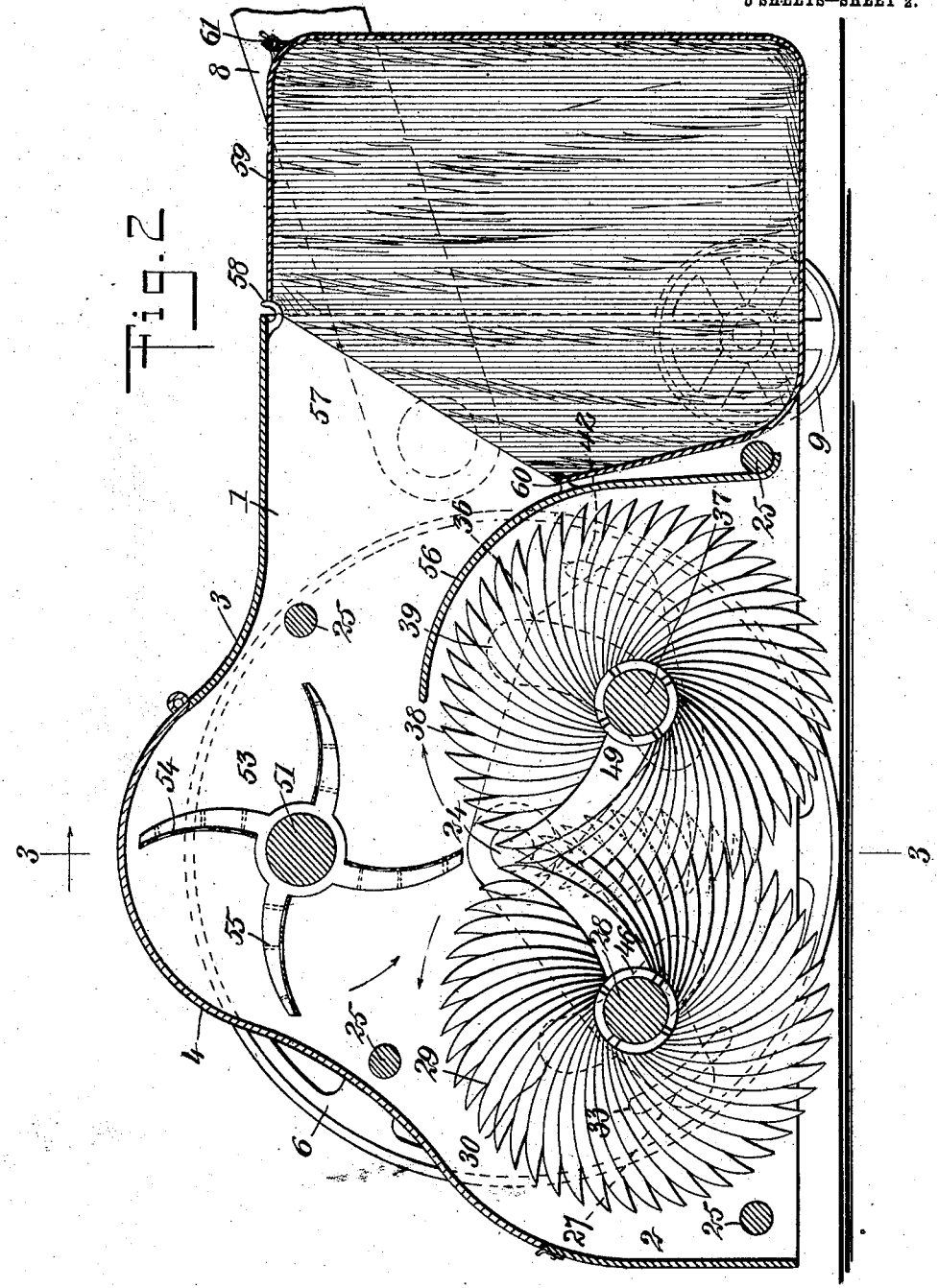

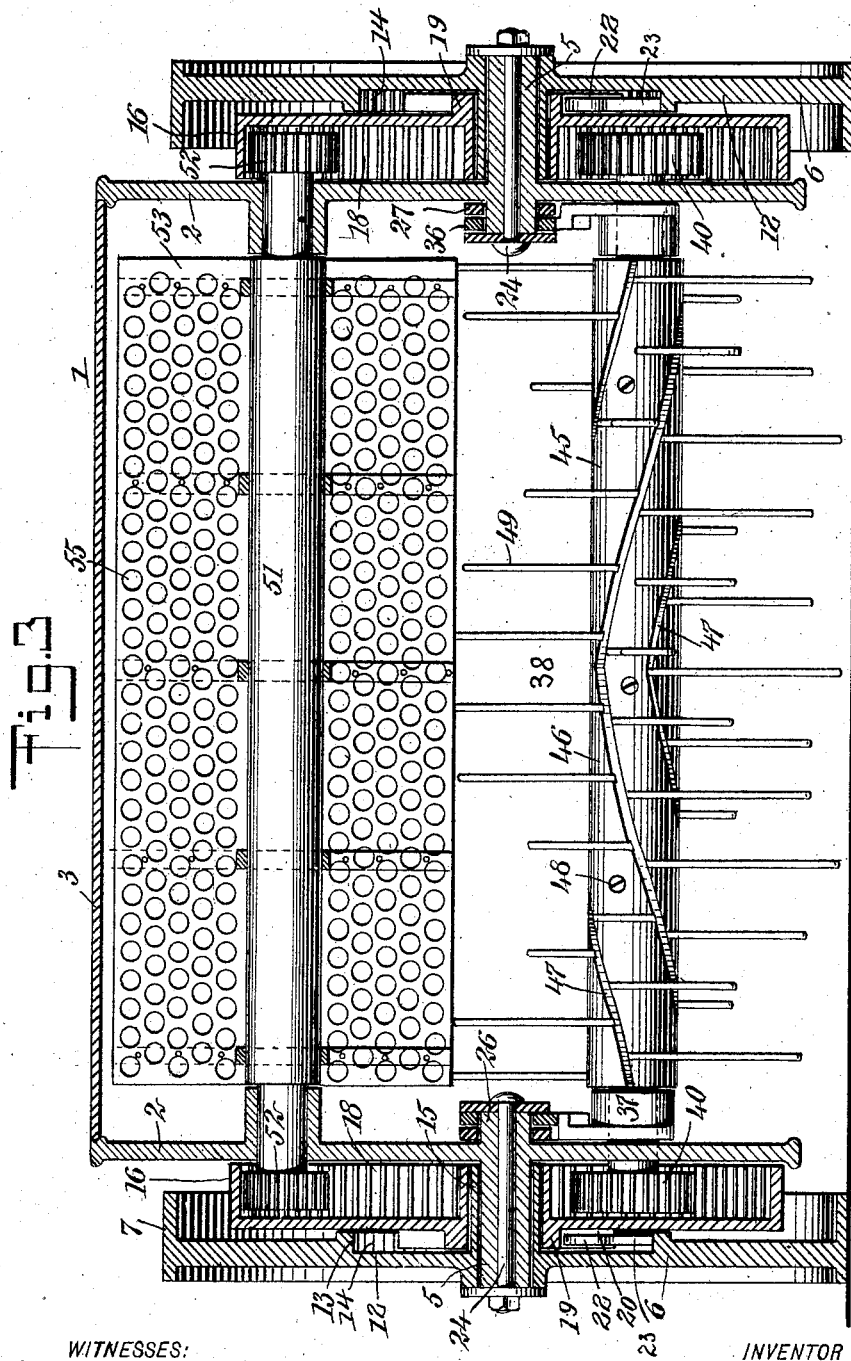

UNITED STATES PATENT OFFICE.

CLARENCE HENRY MOSHER, OF SALISBURY MILLS, NEW YORK.

LAWN-CLEANER.

No. 850,777.　　　　Specification of Letters Patent.　　　Patented April 16, 1907.

Application filed March 24, 1906. Serial No. 307,868.

*To all whom it may concern:*

Be it known that I, CLARENCE HENRY MOSHER, a citizen of the United States, and a resident of Salisbury Mills, in the county of Orange and State of New York, have invented a new and Improved Lawn-Cleaner, of which the following is a full, clear, and exact description.

This invention relates to a machine for cleaning the sward of lawns. More specifically, its purpose is to enable refuse, such as dead leaves and papers, to be removed.

The object of the invention is to produce a machine of this class which is of simple construction and which can be readily moved across a lawn in the manner of a lawn-mower, operating at the same time to pick up any articles which may pass under it and which may be operated by horse or motor power.

The invention consists in the construction and combination of parts to be more fully described hereinafter and particularly set forth in the claims.

Reference is to be had to the accompanying drawings, forming a part of this specification, in which similar characters of reference indicate corresponding parts in all the figures.

Figure 1 is a side elevation of the machine, a portion of the operating-handle being broken away. Fig. 2 is a vertical section taken in a front and rear direction through the machine. Fig. 3 is a vertical longitudinal section on the line 3 3 of Fig. 2. Fig. 4 is a cross-section through the machine near one of the end walls thereof and looking outwardly. Fig. 5 is an elevation in section illustrating a part of the driving mechanism. Fig. 6 is a section taken substantially on the line 6 6 of Fig. 4. Fig. 7 is a section taken on the line 7 7 of Fig. 4. Fig. 8 is a side elevation showing in detail one of the fingers or teeth of the rake which constitutes a feature of the invention. Fig. 9 is a developed view showing the tooth-carriers to which the teeth of the rakes are attached, and Fig. 10 is a diagrammatic view illustrating a modified driving arrangement for the machine.

Referring more particularly to the parts, 1 represents a case presenting side plates 2, connected by a hood 3, the said hood being provided with a cover 4, adapted to be opened so as to expose the interior of the case. The side plates 2 are provided on their outer faces with outwardly-projecting bosses 5, which constitute spindles upon which drive-wheels 6 are rotatably mounted, the said drive-wheels having ribbed rims 7, which run upon the ground when the machine is advanced by means of the handle 8. Near the rear the case 1 is supported upon trainer-wheels 9, carried in forks 10, which are formed with pintles rotatably mounted in sockets 11, as shown. The bodies of the driving-wheels 6 are formed with enlarged centers or disks 12, and on the inner face of each of these disks there is formed a flange 13, presenting internal teeth 14, as indicated most clearly in Fig. 5.

As shown most clearly in Fig. 3, the driving-wheels 6 are formed with elongated sleeves 15, which are rotatably mounted on the bosses 5. Upon these sleeves 15 gear-wheels 16 are respectively mounted, each of these gear-wheels being provided on its rim with internal teeth 18. Each gear-wheel is further provided on its outer face with a pawl-carrier 19, the construction of which is very clearly shown in Fig. 5. This pawl-carrier presents a plurality of sockets 20, disposed in oppositely-arranged pairs, the said sockets being of substantially circular form, as shown, and presenting openings 21. In these sockets 20 pawls 22 are mounted, said pawls having substantially circular heads working in the sockets and outwardly-projecting bodies 23. The points of these pawls are arranged so that they lie near the teeth 14, and the pawls are arranged as shown in Fig. 5, so that they all point in the same direction with respect to a radial line drawn through them. With this arrangement when the driving-wheels are rotated the pawls 22 engage the teeth 14 and rotate the gears 16. At the same time it should be understood that while the pawls operate to advance the gear-wheels the gear-wheels may move at a greater speed of rotation than the pawl-carriers, at which time the tips of the pawls will simply slip idly over the teeth. The driving-wheels 6 and the gear-wheels 16 are retained upon the bosses 5 by means of a screw-bolt 24.

The side plates 2 are connected by suitable horizontal tie bolts or braces 25. On the inner face of each of the side plates 2 a boss 26 is formed, the same being in axial alinement with the boss 5 on the corresponding plate. Upon these bosses 26 inclined forwardly-projecting arms 27 are pivotally attached, and these arms support radially the shaft 28 of a rake 29. The extremities of this shaft 28 are reduced and pass through circumferentially-disposed slots 30, formed in the side plates, as indicated. The reduced extremities of this shaft are provided with pinions 31, respectively, which engage with the teeth 18 of the gear-wheels 16. From this arrangement it should be understood that as the gear-wheels rotate they operate to rotate the rake 29. In order to enable the position of the arms 27 to be adjusted as desired, the outer extremities of these arms are provided each with a clamping-bolt 32, the said clamping-bolt passing through a circumferential slot 33, formed in the side plate, and to insure that the arms will be rigidly held when clamped as described the adjacent faces of the side plates 2 are provided with circumferentially-disposed teeth 34, which are adapted to be engaged by a tooth formed on each of the arms, as will be readily understood. By reason of the fact that the axis of rotation of the arms 27 is also the axis for the gear-wheel it follows that the pinion 31 will always be in mesh with the gear-wheels 16 whatever be the position of the arm. I provide also rearwardly-projecting arms 36, which are pivotally attached upon the bosses 26, respectively. These arms are wider toward their extremities, as indicated in Fig. 4, and toward their lower edges support rotatably the shaft 37 of a rear rake 38, and this shaft 37, like the shaft 28, is formed with reduced extremities which pass through circumferentially-disposed slots 39, formed in the side plates 2, their outer extremities being provided with pinions 40. These pinions 40 do not mesh directly with the teeth of the gear-wheels 16, but are driven therefrom by means of idlers 41, pivotally attached to the arms 36, as indicated. This arrangement is adopted for the purpose of giving the rake 38 a different direction of rotation from the rake 29. An arrangement is adopted in connection with the arms 36 for clamping the same rigidly in position, which arrangement is similar to that described in connection with the arms 27, circumferential slots 42 being provided through which clamping-bolts 43 pass, the said bolts being carried by the extremities of the arms 36. Circumferentially-disposed teeth 44 are arranged for engaging a tooth 35, carried on each of the arms.

The outer surfaces of the shafts 28 and 37 are composed of plates or tooth-carriers 45, a developed form of which is shown in Fig. 9.

curved form, as shown, and are arranged so that they project forwardly with respect to the direction of rotation of the rake of which they form a part. The distance between the rakes is substantially that shown in Fig. 2, so that the teeth of one rake project beyond the teeth of the opposite rake.

In the upper portion of the case 1 a longitudinally-disposed shaft 51 is arranged, the extremities whereof are rotatably mounted in the side plates 2. The extremity of this shaft is provided with a pinion 52, which meshes with the teeth 18 of the corresponding gear-wheels 16. Upon the shaft 51 a fan 53 is rigidly secured, the said fan having a plurality of curved blades formed with plates 54, having perforations 55 therein, as indicated. These blades are preferably curved and project forwardly with respect to the direction of rotation of the fan. As indicated most clearly in Fig. 2, the upper portion of the case and cover are shaped so as to form a rudimentary fan-chamber, in which the fan rotates.

Within the case and just to the rear of the rear rake 38 a curved guard or guard-plate 56 is provided, whereby a rudimentary flue 57 is formed extending toward the rear of the case. The rear side of the case is open, as shown, and is provided at its upper edge with hooks 58, which facilitate the attachment of a bag 59. Similar hooks 60 are provided on the rear side of the guard-plate 56, and the sides of the handle 8 are similarly provided with hooks 61, upon which a portion of the bag may be attached, as shown. It need hardly be stated that this bag is for the purpose of catching the leaves and other refuse picked up by the machine.

In operating the machine it should be pushed by means of the handle 8 across the lawn in the same manner as a lawn-mower. The rakes 29 and 38 will then be rotated in the direction of the arrows adjacent to them, as indicated in Fig. 2—that is, their adjacent sides will move upwardly. In this way the teeth of the rakes will operate to pick up an object passing into the space between them. The objects picked up by the rakes will be brought into the lower portion of the fan-chamber and come under the influence of the current generated thereby, so that they will be directed toward the rear through the flue 57 into the bag 59 or similar receptacle. I prefer to provide the blades of the fan with perforations in the manner instance I provide the driving-wheels each with an external gear 62 and an internal gear 63. The shaft 64 of the forward rake is driven by means of a pinion 65, which meshes with the internal gear, while the shaft 66 of the rear rake is driven by a pinion 67, which meshes with the external gear. In this way the rakes may be rotated in opposite directions without having recourse to an intermediate idler, as in the first form. The shaft 68 of the fan is provided with a pinion 69, which is driven by means of an idle pinion 70, meshing with the external gear.

In connection with the pawl-carriers 19 attention is called to the fact that the sockets 20 are arranged in pairs, as described, opening in opposite directions. This arrangement enables me to reverse the positions of the pawls, so that they may operate to drive the gear-wheels 16 in a reverse direction, if desired.

Having thus described my invention, I claim as new and desire to secure by Letters Patent—

1. In a machine of the class described, in combination, a case, a gear-wheel mounted thereupon, driving-wheels, means for driving said gear-wheel from one of said driving-wheels, rotatable rakes, pinions carried by said rakes and meshing with said gear-wheels, and means for fixing said rakes to adjust the distance therebetween.

2. In a machine of the class described, in combination, a case presenting an end plate, a side plate, a gear-wheel rotatably mounted on said side plate, means for driving said gear-wheel with the advance of said machine, circumferentially-disposed guide-slots in said side plates, rotatable rakes having shafts passing through said slots and having pinions meshing with said gear-wheel, and means for fixing the axes of said rakes to said side plates.

3. In a machine of the class described, in combination, a case presenting side plates, a gear-wheel rotatably mounted on said side plates, means for continuously driving said gear-wheel with the advance of the machine, arms mounted on said side plates, rotatable rakes carried by said arms, means for continuously driving said rakes from said gear-wheel, and means for adjusting the angular position between said arms.

4. In a machine of the class described, in combination, a case presenting side plates, a gear-wheel rotatably mounted on said side plates, means for rotating said gear-wheel with the advance of the machine, said side plates having circumferentially-disposed slots therein, rotatable rakes having shafts passing through said slots, pinions carried by said shafts engaging said gear-wheel to rotate said rakes, arms attached to said case on the axis of said gear-wheel and carrying said shafts, and means for adjusting said arms.

5. In a machine of the class described, in combination, a case, a pair of rotatable rakes mounted in the lower portion thereof, means for adjusting the distance between said rakes, a fan disposed above said rakes, means for continuously rotating said rakes and said fan, and a receptacle to which said fan delivers.

In testimony whereof I have signed my name to this specification in the presence of two subscribing witnesses.

CLARENCE HENRY MOSHER.

Witnesses:
PETER CANTLINE,
K. M. SEEGER.